April 26, 1960

R. E. THOMPSON 2,933,946

SAFETY POSITIONING DEVICE

Filed Feb. 8, 1957

INVENTOR.
Reginald E. Thompson
BY Mueller & Aichele
Attys

April 26, 1960 R. E. THOMPSON 2,933,946
SAFETY POSITIONING DEVICE
Filed Feb. 8, 1957 2 Sheets-Sheet 2

INVENTOR.
Reynald E. Thompson
BY Mueller & Aichele
Atty's

United States Patent Office 2,933,946
Patented Apr. 26, 1960

2,933,946

SAFETY POSITIONING DEVICE

Reynald E. Thompson, Mount Prospect, Ill., assignor to Motorola, Inc., a corporation of Illinois Application February 8, 1957, Serial No. 638,951

13 Claims. (Cl. 74—477)

This invention relates to new and useful improvements in positioning devices and more particularly to a selector device for control of an automatic transmission for an automobile.

In the development of the modern automobile, there has developed a considerable demand for a fully automatic transmission in which the automobile is automatically provided with a desired gear setting according to the setting of a selector mechanism mounted on the steering wheel or on the dashboard. Automatic transmissions which are now in use generally include drive gear, low gear, reverse gear, and neutral gear settings. If the transmission is set in the drive gear setting the automobile will start out in low gear and will automatically shift through an intermediate gear setting into high gear upon reaching a predetermined speed. If it is desired to operate the automobile in low gear or in reverse gear, the selector mechanism must be set at the appropriate gear setting. The neutral gear setting is generally used during idling and during starting of the motor. A similar arrangement of gear settings is used in automobiles which use a variable torque converter. In the past, the selector mechanisms which have been used have consisted of a lever mounted on the steering wheel post which is movable to any of the desired settings of the transmission and which actuates a cable for adjusting the setting of the transmission in accord with the setting of the transmission lever.

There has recently developed a demand for the elimination of the automatic gear selector lever from the steering wheel post and substitution of a simple push-button device on the dashboard which will select a desired gear setting upon the depression of a push button which is marked for the desired setting. In some push-button devices it has been possible, in the event that a push button was not completely actuated, for the previous button to be released without establishing the new setting. This type of operation could result in the occurrence of a condition where no push button is actuated and the transmission control is not held in any fixed position. In such a condition the operator could have pushed one push button to set a new gear setting and yet the transmission control may be in the previous gear setting or in some other unknown gear setting. This could result in an unsafe and dangerous condition.

It is therefore one object of this invention to provide a new and improved selector device for automobile automatic transmissions in which the desired gear setting of the transmission is selected by depression of a push-button actuator.

Another object of this invention is to provide an improved push-button actuator controlled positioning device for an automobile automatic transmission in which the transmission will assume a desired safe position in the event that one of the push buttons is partially actuated and released with the result that no push button is in an actuated position.

A feature of this invention is the provision of a positioning device having a control member which is positioned by the coaction of laterally movable slide members and which includes a safety member movable to set the control member in a selected safe position upon occurrence of a condition in which none of the slide members are in operative engagement with the control member.

Another feature of this invention is the provision of a positioning device having a treadle bar which is pivotally movable by any one of a plurality of laterally movable slide members which are arranged for engagement therewith to establish a desired position for the treadle bar, and a safety slide member which is engageable with the treadle bar to establish a selected safe position therefor upon occurrence of a condition in which none of the actuating slide members are in engagement with the treadle bar.

A still further feature of this invention is the provision of a positioning device for an automatic transmission for an automobile having push button actuated means to establish a desired gear setting for the automatic transmission and which includes safety means operable to establish a neutral gear setting for the transmission upon occurrence of a condition in which none of the gear selecting push buttons are in a properly actuated position.

In the accompanying drawings, to be taken as part of this specification, there is clearly and fully illustrated a preferred embodiment of this invention in which drawings.

This invention comprises a new and improved positioning device of general application but which is especially adapted for the control of automatic transmissions in automobiles. This positioning device is actuated to any one of a plurality of operating positions by separate push-button actuators and has a safety actuator for establishing a desired safe position upon occurrence of an unsafe condition where none of the push-button actuators is properly actuated. In this positioning device, there is provided a pivotally mounted treadle bar which is adapted for connection to the control cable of an automatic transmission. The treadle bar is arranged for engagement by a plurality of key slide members having spaced arms which are engageable therewith to establish a selected position therefor. When the treadle bar is positioned in a desired position by one of the key slide members the key slide member is held in position by a latch member such as a spring operated latch bar. The movement of any other key slide member will move the latch bar to release the key slide member previously actuated and to engage the treadle bar and establish a new position therefor. There is also provided a safety key slide member which is normally latched in a disengaged position and which is engageable with the treadle bar to move the same to a neutral gear setting. The safety slide member is provided with a latching mechanism which is releasable upon occurrence of a condition in which none of the key slide members is in a properly actuated position. This arrangement insures that in the event none of the push buttons is properly actuated the selector device will be moved to a neutral gear setting.

Figure 1:
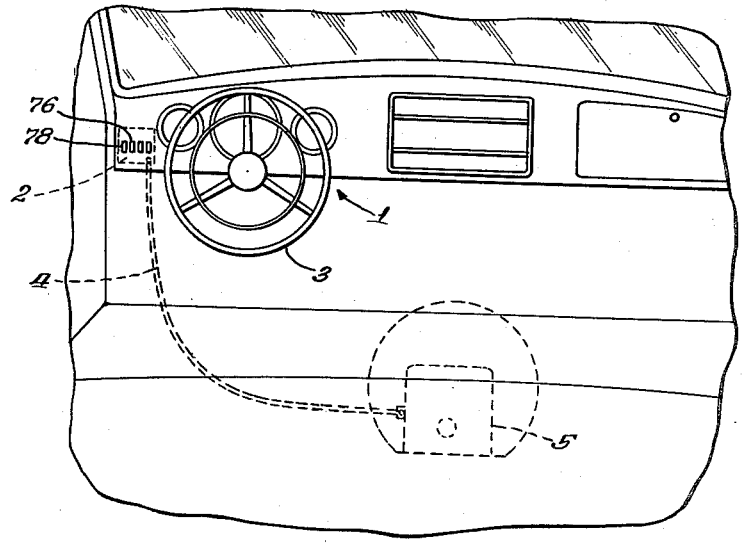
Fig. 1 is a view of the dashboard of an automobile showing a gear selector on the dashboard having push buttons for the desired gear setting and showing in dotted lines the cable connection to the automatic transmission which is actuated thereby.
Figure 1:

In Fig. 1 there is shown a conventional dashboard for an automobile having a plurality of instruments 1 located thereon and showing a transmission selector box for positioning device 2 located to the left of the steering wheel 3. The transmission selector box 2 could be located elsewhere on the dashboard or could even be located on the steering wheel post if desired. A dotted connection 4 is shown extending from the transmission control to the automatic transmission 5 with the connection 4 being a control cable which actuates an automatic transmission 5 of conventional design. Most automatic transmissions have four gear settings. There are usually provided settings for driving and low forward gear speeds and for a reverse gear setting and a neutral gear setting. The selector device 2 is shown and described as having four settings of the type just mentioned. It should be noted, however, that the selector device could easily be altered to provide for additional forward or reverse gear settings or for a parking gear setting as provided on some automobiles.

Figure 2:
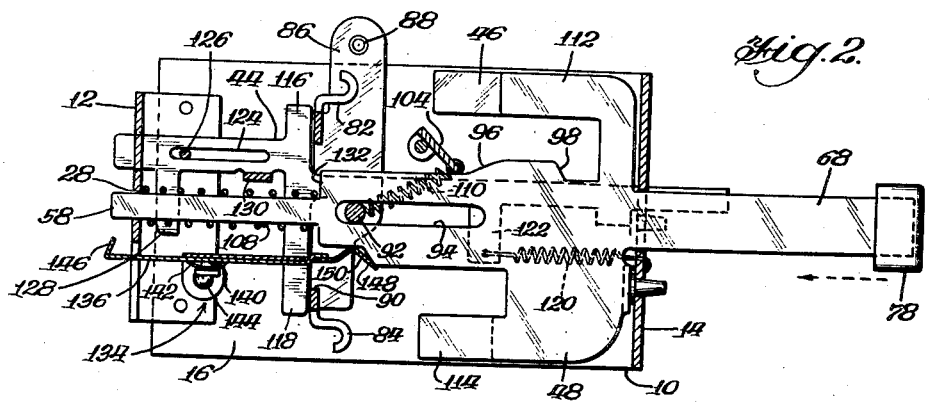
Fig. 2 is a view in longitudinal section of the gear selector device showing a safety slide member therein in a position holding the control treadle bar in a neutral position.
Figure 2:
Figure 5:
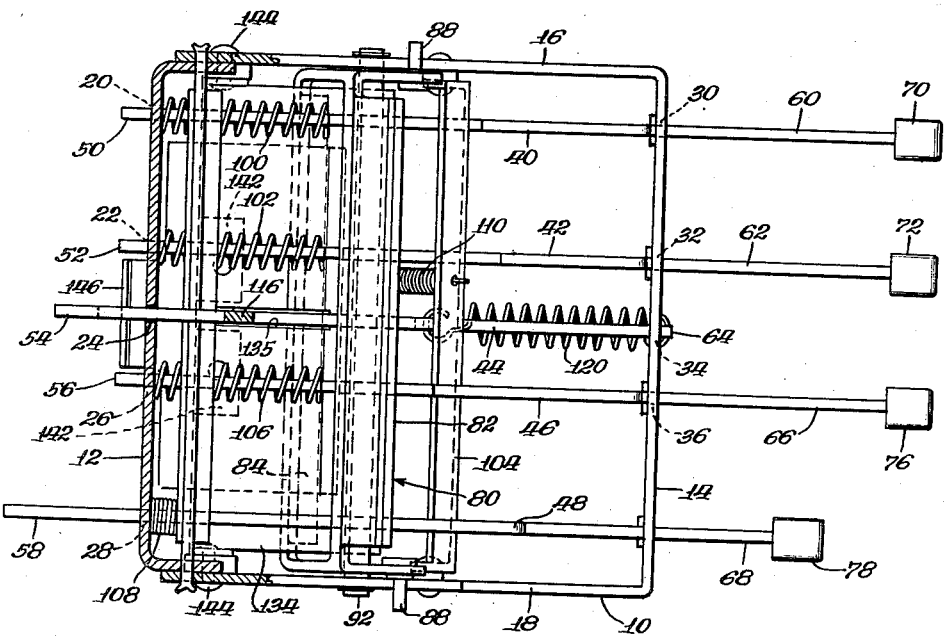
Fig. 5 is a view taken along the section line 5—5 of Fig. 4 showing in more detail the selector slide members and the treadle bar and safety slide member which select the desired gear settings.
Figure 6:
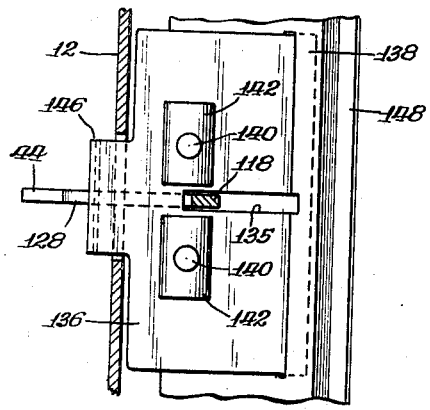
Fig. 6 is a detail sectional view taken along the line 6—6 of Fig. 4 and showing the underside of the latching lever for the safety slide member.

The selector device 2 comprises a box shaped casing 10 having end walls 12 and 14 and side walls 16 and 18 respectively. The end wall 12 may be in the form of a separate piece secured to the remainder of the casing 10 as shown in Figs. 2 and 5. The end wall 12 of the casing 10 is provided with a plurality of slots 20, 22, 24, 26 and 28 therein. The end wall 14 of the casing 10 is similarly provided with a plurality of slots 30, 32, 34, 36 and 38. Within the casing 10 there are slidably positioned a plurality of slide members 40, 42, 44, 46 and 48. The slide members have end portions 50, 52, 54, 56 and 58 which are slidably positioned in the slots 20, 22, 24, 26 and 28 respectively of the end wall 12. The slide members similarly have end portions 60, 62, 64, 66 and 68 which are slidably guided in the slots 30, 32, 34, 36 and 38 respectively of the end wall 14. The slide members 40, 42, 46 and 48 are key slides which are arranged to actuate the positioning device and have push buttons 70, 72, 76 and 78 on the end portions 60, 62, 66 and 68 thereof.

Within the casing 10 there is positioned a treadle bar 80 which has an upper portion 82 and a lower portion 84 which are adapted to be positioned upon engagement by one of the key slides 40, 42, 46 or 48. The treadle bar 80 has a lever arm 86 which is integral therewith and which is adapted to be connected as at 88 to a control cable for the automatic transmission. The treadle bar 80 has a cut out central portion 90 through which the key slides extend. The treadle bar 80 is pivotally mounted on a pivot pin 92 which is supported in the side walls 16 and 18 of the casing 10 and extends across the casing through slots 94 in the key slides 40, 42, 46 and 48. The end portions 50, 52, 56 and 58 of the key slides are provided with springs 100, 102, 106 and 108 which urge the slides to the right of the casing as viewed in Figs. 2, 3 and 4. Each of the key slides has a cam portion 96 and a latching shoulder 98 thereon which cooperates with a latch bar 104 which is urged toward a latching position by a spring 110. The key slides are each provided with upper and lower finger portions or prongs 112, and 114 which are engageable with the upper and lower portions 82 and 84 of the treadle bar 80 to determine the position thereof.

Figure 4:
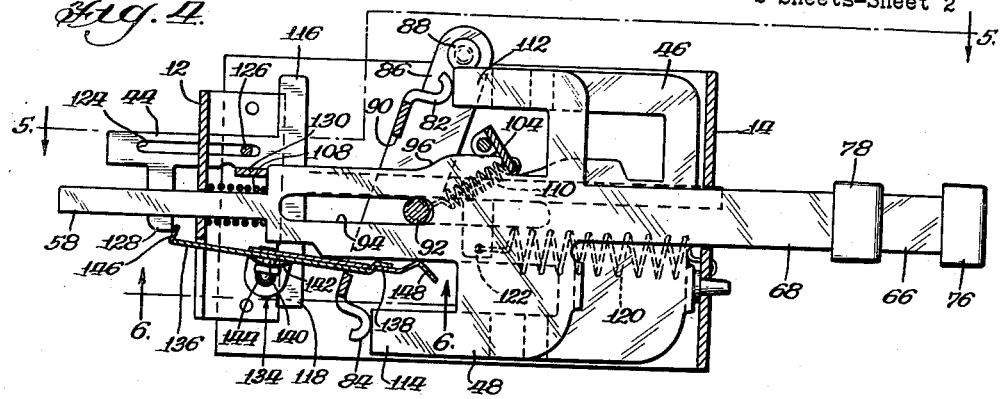
Fig. 4 is a sectional view similar to Fig. 3 showing the gear selector slide moved to a fully actuated position and a safety slide member reset.

The safety slide member 44 has upper and lower projecting portions 116 and 118 which are engageable with the treadle bar 80 to move the same to a selected safe position corresponding to the neutral gear setting of the automatic transmission. The safety slide member 44 is urged toward the right as viewed in Fig. 2 by a spring 120 which is connected to a downwardly extending finger 122 on the safety slide member. The safety slide member also has a slot 124 therein through which there extends a guide pin 126. The safety slide member 44 has a downwardly projecting finger portion 128 for latching the safety slide member in a disengaged position and has a laterally extending projection 130 which is arranged for engagement by a shoulder 132 on the key slides for resetting the safety slide member 44 after a safety operation. The safety slide member 44 is normally latched in a disengaged position (as shown in Fig. 4) by a latching lever structure 134. The latching lever structure 134 includes a lever having two flexible arms 136 and 138 which are connected together as at 140 and arranged for relative movement by the collapsing of a spring washer 142. The latching lever is pivotally connected as at 144 to the side walls 16 and 18 of the casing. The end portion 136 of the latching lever has an upturned portion 146 which cooperates with the downwardly extending finger 128 to secure the safety slide member 44 in a disengaged position. The end portion 138 of the lever member 134 has a rebent portion 148 which cooperates with a cam shoulder 150 and a cam surface portion 152 on the key slides to hold the latching lever 134 in a normally latched position so long as any of the key slides are held in an actuated position.

*Operation*

In the operation of this transmission control the actuation of the automatic transmission 5 is determined by the movement of the control cable 4 to selected positions by the lever portion 86 of the treadle bar 80. The movement of the treadle bar 80 is determined by the engagement of individual ones of the key slide members 40, 42, 46 and 48 therewith. When one of the key slide members 48 is moved to the left by the push button 78, the fingers 112 and 114 thereon engage the upper and lower portions 82 and 84 of the treadle bar 80 to hold the treadle bar in the position shown in Fig. 4. The key slide 48 is held in this position by the latch bar 104 and spring 110 which engages the latching shoulder 98. When another one of the key slides 40, 42 or 46 is moved to the left as viewed in Figs. 2, 3, and 4, the cam surface 96 thereon engages the underside of the latch bar 104 and moves the same out of engagement with the latching shoulder 98 on the previously actuated key slide member 48 to release the same for movement to the right to its initial unlatched position. Further movement, to the left, of the newly actuated key slide member 40, 42 or 46 will cause the latch bar 104 to engage the latching shoulder 98 thereof and hold the same in an actuated position. The newly actuated key slide 40, 42, or 46 has finger portions 112 and 114 thereon of different lengths from the corresponding portions of the key slide member 48 and thus will engage the upper and lower portions 82 and 84 to establish a new position for the treadle bar 80 to provide a new gear setting for the automatic transmission 5. It is thus seen that the actuation of any of the key slide members will first release the key slide member which was previously actuated and upon full movement will cause the key slide member to be latched in position and to establish a new operating position for the treadle bar 80 and the control lever 86 for the automatic transmission 5.

It is to be noted that in the operation of this selector device the previously actuated key slide member is released for return to a disengaged position before the newly actuated key slide member reaches a latched position. If the newly actuated key slide member is released before being moved to a fully actuated position a condition can occur in which none of the key slide members are in engagement with the treadle bar 80. The occurrence of such a condition could be highly dangerous since the operator of the automobile might believe the transmission to be in one gear setting when in fact it was in an entirely different gear setting. To avoid the occurrence of this dangerous condition there is provided in this apparatus the safety slide member 44. The safety slide member 44 is normally held in a position disengaged from the treadle bar 80 as shown in Fig. 4. In this position the safety slide member 44 is latched by the latching lever 134 which engages the downwardly extending finger 128 thereon. The latching lever 134 is held in this latching position by engagement of the rebent end portion 148 with the cam surface 152 of the individual key slide members.

As long as any one of the key slide members is in an actuated position, the latching lever 134 is held in engagement with the finger 128 to hold the safety slide member 44 in the position shown in Fig. 4. However, upon occurrence of a condition, as previously described, in which none of the key slide members is in an actuated position the latching lever 134 moves out of engagement with the finger 128 and the safety slide member 44 is released for movement by the spring 120 into engagement with the treadle bar 80. When the safety slide member 44 engages the treadle bar 80 the upper and lower projecting portions 116 and 118 engage the upper and lower portions 82 and 84 of the treadle bar and move the same to a safety position corresponding to the neutral gear setting for the automatic transmisison 5. With this type of safety mechanism the operator of the automobile will know that if all of the push buttons are out the selector device is in the safety position indicated and the automatic transmission is in a neutral gear setting.

Figure 3:
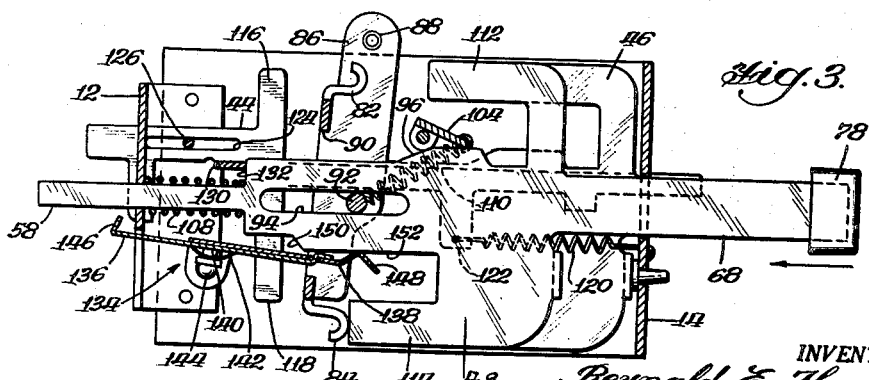
Fig. 3 is a longitudinal sectional view of the gear selector device taken along the same section as Fig. 2 but showing one of the gear selector slides being moved to reset the safety slide member.

The safety slide member 44 is reset to a latched position as shown in Fig. 4 by the actuation of any one of the key slide members. This resetting operation is shown in Fig. 3 in which the key slide member 48 is moved to the left and the shoulder 132 thereon has engaged the lateral projection 130 on the safety slide member 44 to begin to move the safety slide member toward a reset position. As the key slide member 48 is moved to the left, the cam shoulder 150 and cam surface 152 moves along the rebent end portion 148 of the latching lever 134 and moves the same to a position where the rebent end portion 146 may engage and latch the safety slide member 44. Further movement of the key slide member 48 will cause the downwardly extending finger 128 of the safety slide member 44 to move over the end portion 146 of the safety lever 134 and thus permit the safety lever 134 to assume a latched position as shown in Fig. 4. The double arm arrangement and spring washer 142 in the safety latching lever 134 permits the arm 136 of the latching lever to be bent downwardly relative to the other arm 138 as the downwardly extending finger 128 is moved thereover. When the key slide member 148 is moved sufficiently to reset the safety slide member 44 the latch bar 104 will have moved into a latching position behind the latching shoulder 98 as shown in Fig. 4 to retain the key slide in an actuated position. After the safety slide member 44 has been reset in this manner any further actuation of the key slide members will cause the treadle bar 80 to assume the desired position for any desired gear setting as determined by the engagement of the finger portions 112 and 114 with the upper portion 82 and lower portion 84 of the treadle bar 80. The safety slide member 44 will continue to be held in the latched position as shown in Fig. 4 as long as any one of the key slides is in a properly actuated and latched position.

I claim:

1. A positioning device including in combination, a movable member, a plurality of separate actuating members separately movable to positions in engagement with said movable member to establish selected positions for said movable member, a safety member movable to engage said movable member to establish a selected safe position therefor, and latch means securing said safety member in a normally disengaged position, said latch means being positioned relative to said actuating members to release said safety member to engage said movable member upon occurrence of a condition in which none of said actuating members is in engagement with said movable member.

2. A positioning device including in combination, a movable member, a plurality of actuating members separately engageable with said movable member to establish successive selected positions for said movable member, a safety member movable to engage said movable member to establish a selected safe position therefor, and latch means securing said safety member in a normally disengaged position, said latch means being positioned relative to said actuating member to release said safety member to engage said movable member upon occurrence of a condition in which none of said actuating members is in engagement with said movable member, said safety member having means engageable by said actuating members upon movement thereof to reset said safety member from an actuated position.

3. A positioning device including in combination, a movable member, a plurality of separate actuating members separately engageable with said movable member to establish successive selected positions for said movable member, latch means for securing said actuating members individually in an actuated position and arranged so that actuation of each actuating member releases the previously actuated member and establishes a new position for said movable member, a safety member biased toward engagement with said movable member to establish a selected safe position therefor, and safety latch means engageable with said safety member to secure the same in a position disengaged from said movable member, said safety latch means being arranged to be held in engagement with said safety member so long as any of said actuating members is in an actuated position and to release said safety member for engagement with said movable member when none of said actuating members is in an actuated position.

4. A positioning device including in combination, a treadle bar, a plurality of pronged actuating members separately engageable with said treadle bar to establish successive selected positions for said treadle bar, a safety member movable to engage opposite ends of said treadle bar to establish a selected safe position therefor, and latch means securing said safety member in a normally disengaged position, said latch means being positioned relative to said pronged actuating members to release said safety member to engage said treadle bar upon occurrence of a condition in which none of said pronged actuating members is in engagement with said treadle bar.

5. A positioning device including in combination, a pivoted treadle bar, a plurality of pronged actuating members positioned for sliding movement and separately engageable with opposite ends of said treadle bar to establish successive selected positions for said treadle bar, latch means for securing said pronged actuating members individually in an actuated position with the prongs thereof engaging opposite ends of said treadle bar and arranged so that the actuation of each actuating member releases the previously actuated member and establishes a new position for said treadle bar, a safety member biased toward engagement with said treadle bar and engageable with opposite ends thereof to establish a selected safe position therefor, and safety latch means engageable with said safety member to secure the same in a position disengaged from said treadle bar, said safety latch means being arranged to be held in engagement with said safety member by individual ones of said actuating members so long as any of said actuating members is in an actuated position and to release said safety member for engagement with said treadle bar when none of said actuating members is in an actuated position.

6. A positioning device including in combination, a pivotally mounted treadle bar, a plurality of pronged actuating members mounted for sliding movement and separately engageable with opposite ends of said treadle bar to establish successive selective positions for said treadle bar, a pivoted latch bar for said actuating members operable to secure individual ones of said actuating members in an actuated position, each of said actuating members having a cam surface engageable with said latch bar to move the same out of latching engagement with the previously latched actuating member to release the same for movement to its initial position, with the prongs of such member being engageable with opposite ends of said treadle bar to establish a new position therefor, a safety member biased toward engagement with said treadle bar to establish a selected safe position therefor, a latching lever engageable with said safety member to secure the same in a position disengaged from said treadle bar, said latching lever being arranged to be held in engagement with said safety member by individual ones of said actuating members so long as any of said actuating members is in an actuated position and being movable to release said safety member for engagement with said treadle bar when none of said actuating members is in an actuated position.

7. A selector device for an automatic transmission for an automobile which is controlled by movement of a control cable to a plurality of control positions corresponding to forward, reverse, and neutral gear positions, which device includes a pivotally mounted treadle bar adapted to be connected to the control cable and operable upon pivotal movement to establish a desired gear position, a plurality of actuating members separately engageable with said treadle bar to establish successive selected positions for said treadle bar corresponding to desired gear positions for the automatic transmission, and safety means operable to move said treadle bar to a safe position corresponding to the neutral gear setting of the automatic transmission upon occurrence of a condition in which none of the actuating members is in engagement with said treadle bar.

8. A selector device for an automatic transmission for an automobile which is controlled by movement of a control cable to a plurality of control positions corresponding to forward, reverse, and neutral gear positions, which device includes a treadle bar adapted to be connected to the control cable and mounted for pivotal movement, a plurality of push-button actuating members slidably mounted and having two prongs engageable with opposite ends of said treadle bar to establish successive selected positions for said treadle bar corresponding to desired gear settings of the automatic transmission, latch means for said actuating members operable to secure individual ones of said actuating members in an actuated position in engagement with said treadle bar and arranged so that the actuation of each actuating member releases the previously actuated member and establishes a new position for said treadle bar, a safety member biased toward engagement with said treadle bar to establish a safe position therefore corresponding to the neutral gear setting of the automatic transmission, safety latch means engageable with said safety member to secure the same in a position disengaged from said treadle bar, said safety latch means being arranged to be held in engagement with said safety member by individual ones of said actuating members so long as any actuating member is in an actuated position and to release said safety member when none of said actuating members is in an actuated position and thereby to engage said treadle bar to move the same to a position corresponding to the neutral gear setting of the automatic transmission.

9. A selector device for an automatic transmission for an automobile which is controlled by movement of a control cable to a plurality of control positions corresponding to forward, reverse and neutral gear positions, which device includes a casing, a treadle bar pivotally mounted in said casing and adapted to be connected to the control cable of said automatic transmission, a plurality of push button operated key slide members mounted in said casing for sliding movement, a plurality of springs associated one with each of said key slide members and urging the same away from engagement with said treadle bar, each of said key slide members having prongs engageable with opposite ends of said treadle bar upon predetermined movement to establish a selected position for said treadle bar corersponding to a desired gear setting, each of said key slide members having a guide portion with upper and lower cam surfaces thereon and a latching shoulder, a pivoted latch bar engageable with the latching shoulder on each of said key slide members upon said predetermined movement to secure the same against its spring, each of said key slide members being operable upon movement to engage the upper cam surface thereof to move said latch bar to release the previously latched key slide member for return to its initially disengaged position and to establish a new position for said treadle bar, a safety slide member mounted for sliding movement in said casing and having upper and lower portions engageable with said treadle bar to move the same to a position corresponding to a neutral gear setting, a spring connected to said safety slide member urging the same toward engagement with said treadle bar, said safety slide member having a latching abutment thereon, a latching lever pivotally mounted in said casing and engageable with said latching abutment to hold said safety slide member in a position normally disengaged from said treadle bar, said latching lever having a portion engageable by said lower cam surface on said key slide members so that said safety slide member is latched as long as any of said key slide members is in an actuated position and releasing said safety slide member for movement against said treadle bar when none of said key slide members is in an actuated position, and an abutment on said safety slide member positioned for engagement by said key slide members to reset said safety slide member to a latched position after a safety operation.

10. A positioning device including in combination, a movable member, a plurality of actuating means each separately engageable with said movable member to establish a selected position for said movable member, a safety member engageable with said movable member to move it to one of said selected positions, and means cooperating with said actuating means for holding said safety member out of engagement with said movable member during engagement between any of said actuating means and said movable member and for releasing said safety member upon occurrence of a condition wherein all of said actuating means are disengaged from said movable member.

11. A positioning device including in combination, a rotatable member, a plurality of actuating means each adapted to engage said rotatable member and move it to a different, predetermined, angular position, with one of said positions being a safe position, a safety member adapted to engage said rotatable member and move it to a predetermined safe position, and means cooperating with said actuating means to hold said safety member out of engagement with said rotatable member during engagement between any of said actuating means and said rotatable member and for releasing said safety member upon occurrence of a condition wherein all of said actuating means are disengaged from said rotatable member.

12. A positioning device including in combination, a movable member, actuating means comprising a plurality of manually operated actuating members separately engageable with said movable member to establish successive selected positions for said movable member, with one of said actuating members being operable to move said movable member to a predetermined safe position, safety means cooperating with said actuating means and operable to move said movable member to said safe position, and means operable automatically to actuate said safety means upon occurrence of a predetermined condition.

13. A positioning device for an automatic transmission of an automotive vehicle, including in combination, a movable member for controlling the transmission, actuating means including a plurality of manually operated actuating members separately engageable with said movable member to move the same to selected positions and thereby establish the transmission in different conditions, safety means operable to move said movable member to a safe position for establishing the transmission in a neutral condition, and means operable automatically upon occurrence of a predetermined condition to actuate said safety means causing the same to move said movable member to said safe position.

References Cited in the file of this patent
UNITED STATES PATENTS

| | | |
|---|---|---|
| 2,307,285 | Mastney | Jan. 5, 1943 |
| 2,610,518 | Goedike et al. | Sept. 16, 1952 |
| 2,823,755 | Hall | Feb. 18, 1958 |
| 2,824,459 | Thabodeau | Feb. 25, 1958 |
| 2,851,887 | Wright et al. | Sept. 16, 1958 |